(12) United States Patent
Zhang et al.

(10) Patent No.: US 9,128,593 B2
(45) Date of Patent: Sep. 8, 2015

(54) ENABLING AN INTERACTIVE PROGRAM ASSOCIATED WITH A LIVE BROADCAST ON A MOBILE DEVICE

(71) Applicant: TENCENT TECHNOLOGY (SHENZHEN) COMPANY LIMITED, Shenzhen, Guangdong (CN)

(72) Inventors: Xiaolong Zhang, Shenzhen (CN); Pinlin Chen, Shenzhen (CN); Keren Li, Shenzhen (CN); Hailong Liu, Shenzhen (CN); Jie Hou, Shenzhen (CN); Dadong Xie, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 217 days.

(21) Appl. No.: 13/989,732

(22) PCT Filed: Apr. 28, 2013

(86) PCT No.: PCT/CN2013/075011
§ 371 (c)(1),
(2) Date: May 24, 2013

(87) PCT Pub. No.: WO2014/176747
PCT Pub. Date: Nov. 6, 2014

(65) Prior Publication Data
US 2014/0325354 A1    Oct. 30, 2014

(51) Int. Cl.
*G06F 3/00* (2006.01)
*G06F 3/0484* (2013.01)
(Continued)

(52) U.S. Cl.
CPC .......... *G06F 3/04842* (2013.01); *G06F 3/0488* (2013.01); *G06F 17/30743* (2013.01)

(58) Field of Classification Search
CPC ................................................. G06F 17/30743
USPC ......................................................... 715/716
See application file for complete search history.

(56) References Cited

U.S. PATENT DOCUMENTS 8,265,333 B2 * 9/2012 Lahr et al. ...................... 382/100
8,442,265 B1 * 5/2013 Bosworth et al. .............. 382/100
(Continued)

FOREIGN PATENT DOCUMENTS

| AU | 2013200513 B1 | 4/2013 |
| CN | 101494662 A | 7/2009 |
| WO | WO 2012/078142 A1 | 6/2012 |

OTHER PUBLICATIONS

Tencent Tech, ISR, PCT/CN2013/075011, Feb. 6, 2014, 3 pgs.
(Continued)

*Primary Examiner* — William Titcomb
(74) *Attorney, Agent, or Firm* — Morgan, Lewis & Bockius LLP

(57) ABSTRACT

A method of providing an interactive content to a prospective user at a mobile device, the mobile device including a non-transitory computer readable medium including a computer executable program code and a processor for executing the computer executable program code is described. The method includes steps for initiating capture of an audio stream by shaking the mobile device; capturing the audio stream via a microphone in the mobile device; converting the captured audio stream into an audio fingerprint; sending the audio fingerprint to a server; receiving the interactive content from the server if there is a match between audio fingerprints stored on the server, and the audio fingerprint sent by the mobile device; and displaying the interactive content on the mobile device.

20 Claims, 6 Drawing Sheets

(51) Int. Cl.
*G06F 3/0488* (2013.01)
*G06F 17/30* (2006.01)

(56) References Cited

U.S. PATENT DOCUMENTS

| | | | |
|---|---|---|---|
| 8,782,713 B2* | 7/2014 | Kalva et al. | 725/61 |
| 2009/0074235 A1* | 3/2009 | Lahr et al. | 382/100 |
| 2010/0146445 A1* | 6/2010 | Kraut | 715/821 |
| 2010/0257052 A1* | 10/2010 | Zito et al. | 705/14.45 |
| 2012/0210233 A1* | 8/2012 | Davis et al. | 715/727 |
| 2012/0284593 A1* | 11/2012 | Rodriguez | 715/201 |
| 2013/0104080 A1* | 4/2013 | Bosworth et al. | 715/838 |
| 2013/0212176 A1* | 8/2013 | Koulomzin et al. | 709/204 |

OTHER PUBLICATIONS

Haitsma et al.; A Highly Robust Audio Fingerprinting Systems, 2000, 9 pgs.

Wang; An Industrial-Strength Audio Search Algorithm, 2003, 7 pgs.

* cited by examiner

ENABLING AN INTERACTIVE PROGRAM ASSOCIATED WITH A LIVE BROADCAST ON A MOBILE DEVICE

CROSS REFERENCE TO RELATED APPLICATION

This Application is a United States National Stage Application filed under 35 U.S.C. §371 of PCT Patent Application Serial No. PCT/CN2013/075011 filed on Apr. 28, 2013, the contents of which are hereby incorporated in their entirety.

TECHNICAL FIELD

The present invention relates to a system and method of providing an interactive interface to a user who wishes to interact with a live program broadcast from a mobile device, and more particularly, to a system and method in which the user can interact with particular television shows to, for example, vote for the show's contests, request information about the show and its contestants, or buy products associated with the show.

BACKGROUND

The ubiquitous presence of cell phones in our society is universal. It is estimated that there are as many as 6 billion cell phone subscribers on the planet with a population of 7 billion people. Approximately 1 billion of those cell phones are smartphones, and that number is projected to double by 2015. The technological advances found in smartphones continue to become standard features e.g., cameras, Bluetooth, GPS, touch screens, and WiFi are now commonplace in smartphones. While the functionality of smartphones increases, the costs of purchasing such a mobile device continue to decrease. Similarly, other mobile devices including tablets and laptops have shown ever increasing functionality at lower cost.

Concurrently, live program broadcasts via radio, digital radio, satellite radio, webcasts, television, and HDTV are improving in quality and format across platforms. The networks and components for delivering the live program broadcast continue to improve in quality and functionality as well. However, a user's relationship to the live program broadcast remains static. That is, the user watches or listens to the live program broadcast but does little more. There is little or no interaction between the live program broadcast and the user, except for some live program broadcasts that ask users to call a phone number, email, text, or Tweet in their vote for a particular television show's contestant. Additionally, the user may visit the television show's website to cast their vote.

The interaction between the user and the live program broadcast, if any, is cumbersome at best. Today's user must divert his attention from the live program broadcast to dial a phone number that is provided, open an email or SMS application, access their Twitter account to Tweet, or type in the provided URL to interact with the live program broadcast. The cumbersome steps required to interact are a deterrent to a user's participation with the live program broadcast.

With the current cumbersome steps available to users, there is a need for a system that provides a true interactive experience for a user. Thus, a system is needed that will enable a user to quickly and easily interact with a live program broadcast in order to access specific content associated with that live program broadcast at that particular point in the broadcast.

SUMMARY

In accordance with some implementations of the present application, a method of providing an interactive content to a prospective user at a mobile device, the mobile device including a non-transitory computer readable medium including a computer executable program code and a processor for executing the computer executable program code, the method including the steps of: initiating capture of an audio stream; capturing the audio stream via a microphone in the mobile device; converting the captured audio stream into an audio fingerprint; sending information related to the audio fingerprint to a server; and receiving an interactive content from the server, wherein the interactive content is associated with a live program broadcast near the mobile device; and displaying the interactive content on the mobile device.

In accordance with some implementations of the present application, a mobile device comprises a processor; audio circuitry for detecting audio signals and converting the audio signals into audio streams; a sensor for detecting movements of the mobile device; and memory for storing programs. The programs, when executed by the processor, causes the process to perform the following instructions: initiating capture of an audio stream; capturing the audio stream via a microphone in the mobile device; converting the captured audio stream into an audio fingerprint; sending information related to the audio fingerprint to a server; and receiving an interactive content from the server, wherein the interactive content is associated with a live program broadcast near the mobile device; and displaying the interactive content on the mobile device.

In accordance with another implementation of the present application, a method for providing an interactive content to a prospective user at a mobile device is performed at a server having one or more processors and memory for storing programs to be executed by the processors. The method includes: receiving a query from the mobile device, the query including an audio fingerprint derived from an audio stream captured by a microphone of the mobile device; comparing the audio fingerprint with a plurality of candidate audio fingerprints, each candidate audio fingerprint corresponding to a respective live program broadcast that has an associated interactive content accessible to the server; and returning an interactive content to the mobile device, wherein the interactive content is associated with a live program broadcast that has at least one candidate audio fingerprint matching the audio fingerprint.

In accordance with another implementation of the present application, a server comprises: one or more processors; and memory for storing programs to be executed by the processors, the programs further including instructions for: receiving a query from a mobile device, the query including an audio fingerprint derived from an audio stream captured by a microphone of the mobile device; comparing the audio fingerprint with a plurality of candidate audio fingerprints, each candidate audio fingerprint corresponding to a respective live program broadcast that has an associated interactive content accessible to the server; and returning an interactive content to the mobile device, wherein the interactive content is associated with a live program broadcast that has at least one candidate audio fingerprint matching the audio fingerprint.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

Figure 1:
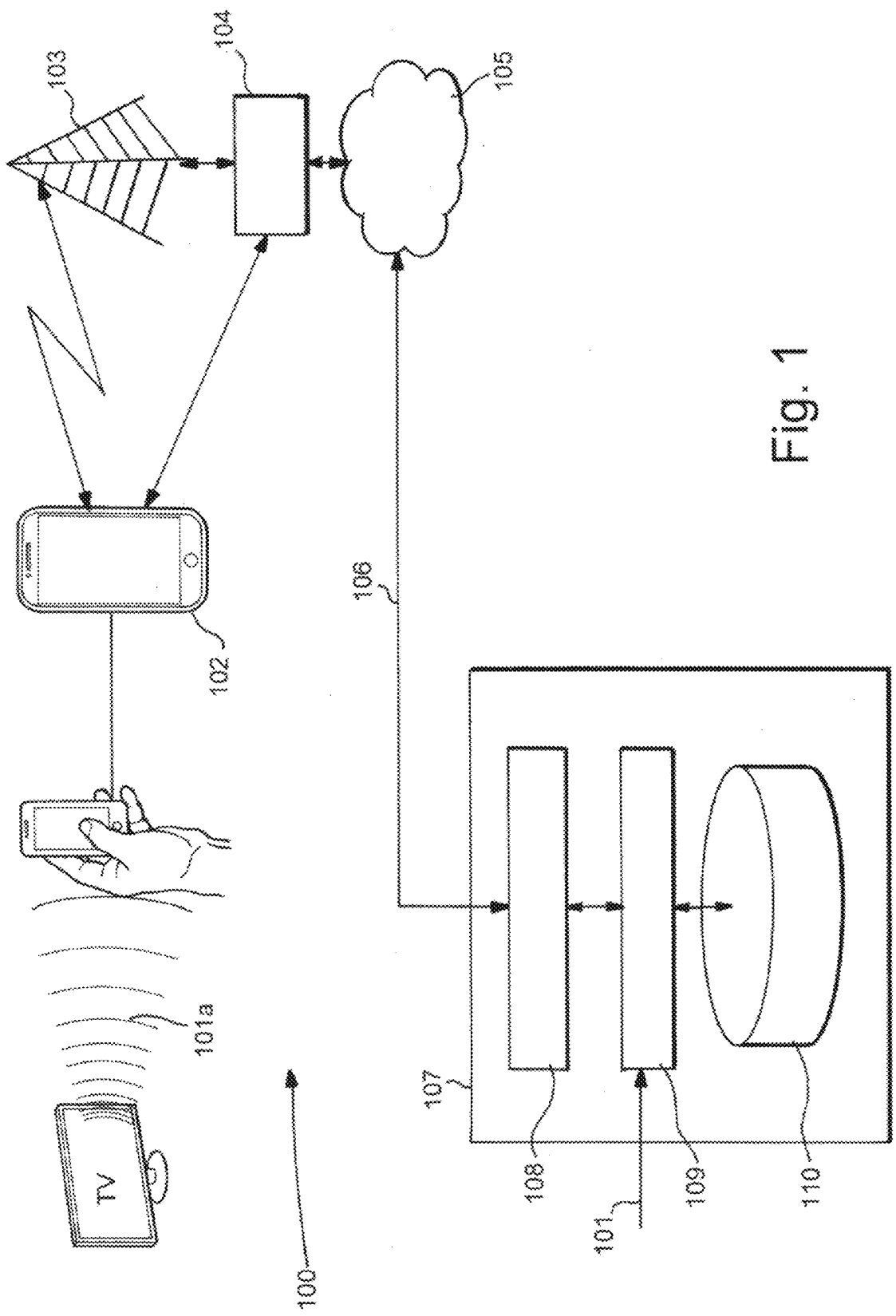
FIG. 1 is a block diagram illustrating a distributed network environment including a mobile device, the Internet, and a remote server in accordance with some implementations.

FIG. 1 is a block diagram illustrating a distributed network environment including a system for providing interactive content to a prospective user according to an exemplary implementation of the present invention.

As shown in FIG. 1, the interactive system 100 includes a live program broadcast 101 that is streaming, a mobile device 102, a tower 103, an internet service provider (ISP) 104, the Internet 105, a communication path for transmitting audio fingerprints 106, a remote server 107, a server frontend 108, a server backend 109, and a database 110. The interactive system 100 includes a user who may open the software application resident on the mobile device 102. The mobile device 102 may include a smartphone, a tablet, a laptop computer, or other portable computing device. As the user reacts to the live program broadcast 101, he activates an audio capture of the audio stream 101a emanating from an electronic device by shaking the mobile device 102 at a particular point in the live program broadcast 101. The electronic device amplifies the audio stream 101a for user to hear. The electronic device may include a radio, digital radio, satellite radio, computer's speakers, television, or HDTV. The mobile device 102 connects with the Internet 105 through the tower 103 or more directly via the user's ISP 104. Transmission of information related to the audio fingerprints 106 (created by a conversion of the audio stream 101a at the mobile device 102) to the remote server 107 allows for possible matching of the captured audio stream 101a with the live program broadcast 101. In some implementations, the audio stream 101a may be transmitted to the server 107 before conversion into the audio fingerprint is undertaken.

The remote server 107 includes the server frontend 108, the server backend 109, and the database 110. The server backend 109 may handle multiple live program broadcasts 101 streaming content so the server backend 109 can build a candidate audio fingerprint dataset of the live program broadcasts 101, and store associated interactive interfaces, programs, and information. In response to a query from the mobile device, the query including an audio fingerprint, the server backend 109 compares the audio fingerprint with the candidate audio fingerprints in the database 110. If a match between the captured audio stream 101a and any of the live program broadcasts 101 is identified, the associated interactive interface, program, and information is pushed by the server frontend 108 to the mobile device 102 for the user to enjoy. It is envisioned that there may be multiple servers required to receive and convert the numerous live program broadcasts into audio fingerprints.

Figure 2:
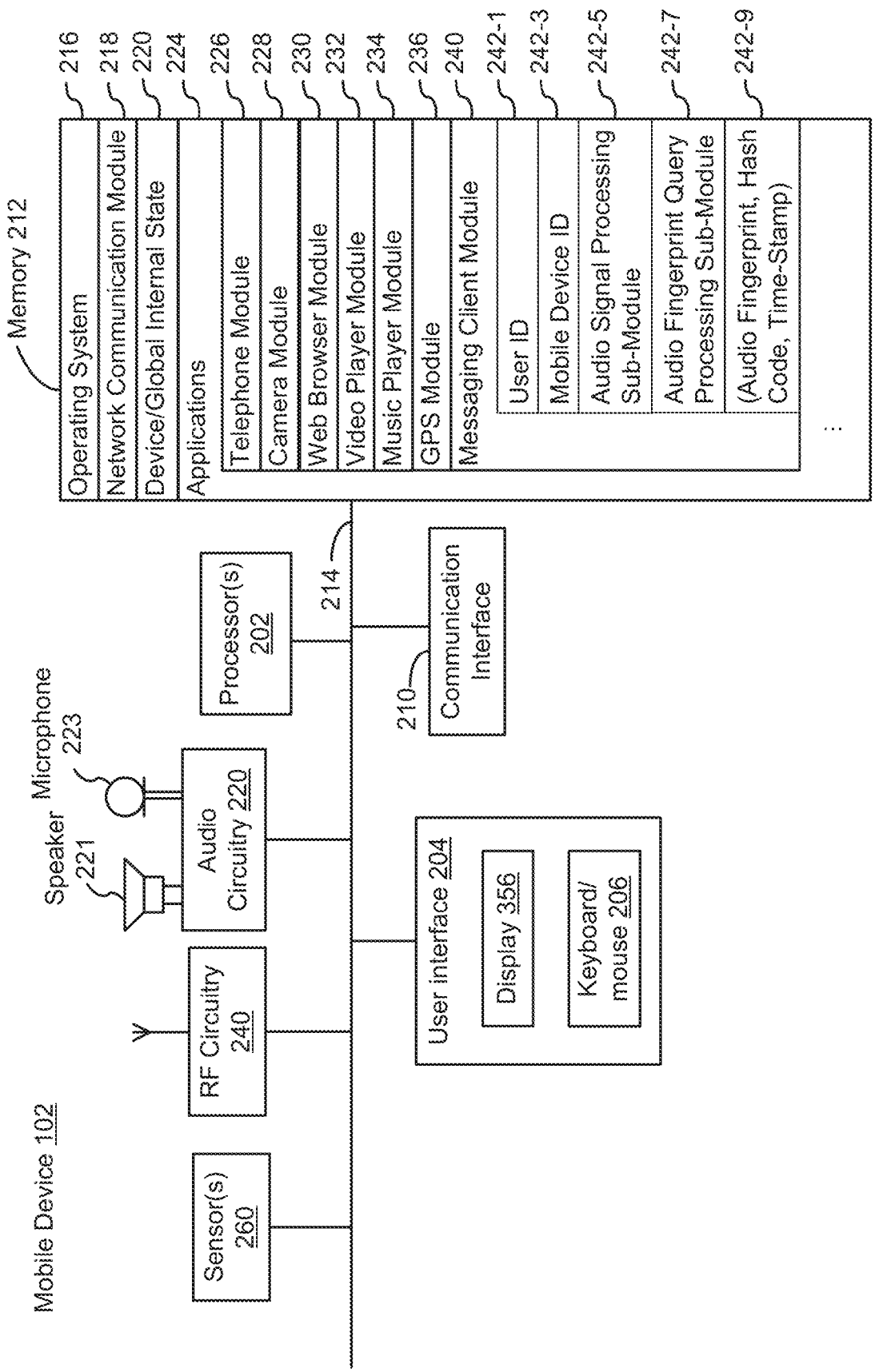
FIG. 2 is a block diagram illustrating different components of the mobile device that are configured for communicating with the remote server and other components in accordance with some implementations.

FIG. 2 is a block diagram illustrating different components of the mobile device 102 that may be configured for capturing, converting, and transmitting the audio stream 101a to the remote server 107 in response to a user activating the mobile device to interact with the live program broadcast. The mobile device 102 includes one or more processors 202 for executing modules, programs and/or instructions stored in memory 212 and thereby performing predefined operations; audio circuitry 220 including speaker 221 and microphone 223, RF (radio frequency) circuitry 240; one or more sensors 260; one or more network or other communications interfaces 210; memory 212; and one or more communication buses 214 for interconnecting these components. In some implementations, the mobile device 102 includes a user interface 204 comprising a display device 208 and one or more input devices 206 (e.g., keyboard, touchscreen, or mouse).

Audio circuitry 220, speaker 221, and microphone 223 provide an audio interface between a user and electronic device streaming audio 101a. Audio circuitry 220 receives electrical signals converted by microphone 223 from the sound waves emanating from the electronic device. Audio circuitry 220 also may receive audio data from the communication buses 214, and convert the audio data to an electrical signal, and transmit the electrical signal to speaker 221. The speaker 221 may convert the electrical signal to human-audible sound waves. Audio circuitry 220 converts the electrical signal to audio data and transmits the audio data to the processors 202 for processing.

RF circuitry 240 converts electrical signals to/from electromagnetic signals and communicates with communications networks and other communications devices via the electromagnetic signals. RF circuitry 240 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 240 may communicate with networks, such as the Internet, an intranet and/or a wireless network, such as a cellular telephone network, a wireless local area network (WLAN) and/or a metropolitan area network (MAN), and other devices by wireless communication.

The sensors 260 in the mobile device 102 may include one or more proximity sensors for turning off and disabling the touch-sensitive display 208 when the mobile device 102 is placed near the user's ear (e.g., when the user is making a phone call). The mobile device 102 may also include one or more accelerometers for detecting the movement of the mobile device 102, a magnetometer for determining the orientation of the mobile device 102, a GPS receiver for obtaining the geographical location information of the mobile device 102, and one or more image sensors for capturing still images or video streams.

In some implementations, the memory 212 includes high-speed random access memory, such as DRAM, SRAM, or other random access solid state memory devices. In some implementations, memory 212 includes non-volatile memory, such as one or more magnetic disk storage devices, optical disk storage devices, flash memory devices, or other non-volatile solid state storage devices. In some implementations, memory 212 includes one or more storage devices remotely located from the processor(s) 202. Memory 212, or alternately one or more storage devices (e.g., one or more nonvolatile storage devices) within memory 212, includes a non-transitory computer readable storage medium. In some implementations, memory 212 or the computer readable storage medium of memory 212 stores the following programs, modules and data structures, or a subset thereof:

- an operating system 216 that includes procedures for handling various basic system services and for performing hardware dependent tasks;
- a network communications module 218 that is used for connecting the mobile device 102 to other computers (e.g., the remote server 107 in FIG. 1) via the communication network interface 210 and one or more communication networks (wired or wireless), such as the Internet 105 in FIG. 1, other wide area networks, local area networks, metropolitan area networks, etc.; and
- device/global internal state 220 including one or more of: active application state, indicating which applications, if any, are currently active; display state, indicating what applications, views or other information occupy various regions of the display of the mobile device; and sensor state, including information obtained from the mobile device's various sensors 260.

Applications 224 stored in the memory 212 may include the following modules (or sets of instructions), or a subset or superset thereof: telephone module 226, camera module 228, web browser module 230, video player module 232, music player module 234, GPS module 236, and messaging client module 240. Note that although named "messaging client module," the module is by no means limited to providing messaging services. For example, the messaging client module 240 may include: an identifier 242-1 of the user of the mobile device 10; a mobile device identifier 242-3 for binding the mobile device 10 to the user's account at the remote server 107; an audio signal processing sub-module for initiating and capturing an audio stream broadcast near the mobile device 10, converting the audio stream into one or more audio fingerprints, and generating a time-stamp or hash code for each audio fingerprint; an audio fingerprint query processing sub-module for submitting a query including an audio fingerprint and associated information to the remote server and processing the response to the query, the response including an interactive content related to the audio signal captured by the mobile device; and one or more data entries, each entry 242-9 including an audio fingerprint from a captured audio stream, a hash code derived from the audio fingerprint, and a time-stamp indicating when the audio stream was captured by the mobile device.

Figure 3:
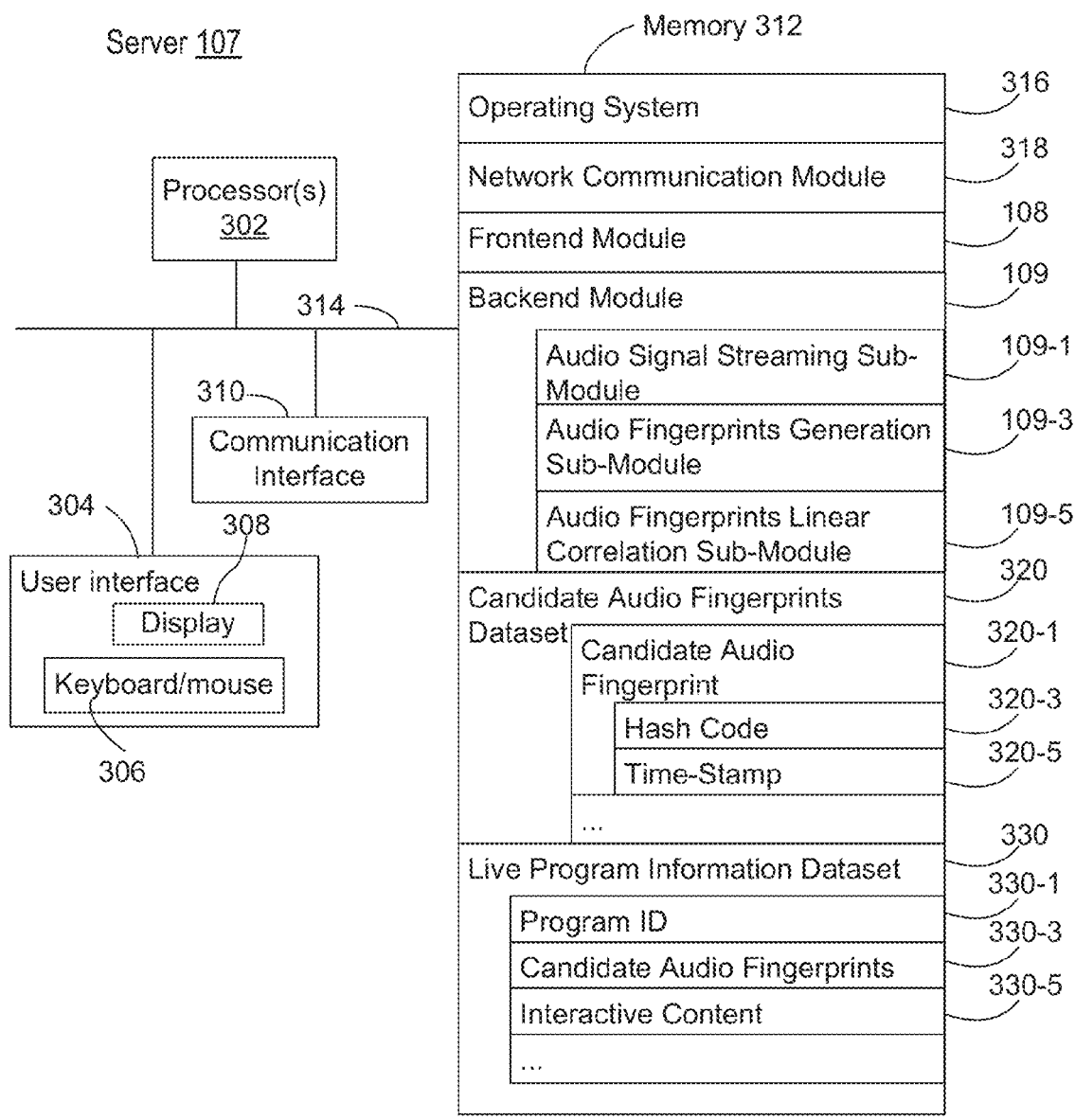
FIG. 3 is a block diagram illustrating different components of the remote server that are configured for communicating with the mobile device and other components in accordance with some implementations.

FIG. 3 is a block diagram illustrating different components of the remote server that are configured for communicating with the mobile device and other components in accordance with some implementations. The remote server 107 includes memory 312; one or more processors 302 for executing modules, programs and/or instructions stored in the memory 312 and thereby performing predefined operations; one or more network or other communications interfaces 310; and one or more communication buses 314 for interconnecting these components. In some implementations, the remote server 107 includes a user interface 304 comprising a display device 308 and one or more input devices 306 (e.g., keyboard or mouse). In some implementations, the memory 312 includes high-speed random access memory, such as DRAM, SRAM, or other random access solid state memory devices. In some implementations, memory 312 includes non-volatile memory, such as one or more magnetic disk storage devices, optical disk storage devices, flash memory devices, or other non-volatile solid state storage devices. In some implementations, memory 312 includes one or more storage devices remotely located from the processor(s) 302. Memory 312, or alternately one or more storage devices (e.g., one or more nonvolatile storage devices) within memory 312, includes a non-transitory computer readable storage medium. In some implementations, memory 312 or the computer readable storage medium of memory 312 stores the following programs, modules and data structures, or a subset thereof:

- an operating system 316 that includes procedures for handling various basic system services and for performing hardware dependent tasks;
- a network communications module 318 that is used for connecting the remote server 107 to other computers (e.g., the mobile device 10 in FIG. 1) via the communication network interfaces 310 and one or more communication networks (wired or wireless), such as the Internet 105 in FIG. 1, other wide area networks, local area networks, metropolitan area networks, etc.;
- a frontend module 108 for receiving a query from the mobile device 10 for an interactive content associated with an audio fingerprint included in the query and returning an identified interactive content that matches the audio fingerprint to the mobile device 10;
- a backend module 109, further including an audio signal streaming sub-module 109-1 for streaming the audio signals from a live program broadcast service provider, an audio fingerprints generation sub-module 109-3 for converting the received audio streams into audio fingerprints and generating hash codes for the audio fingerprints, and an audio fingerprints linear correlation sub-module 109-5 for generating a linear correlation measurement between two audio fingerprints to determine the similarity between the audio streams associated with the two audio fingerprints;
- a candidate audio fingerprints dataset 320 for storing candidate audio fingerprints 320-1 provided by the audio fingerprints generation sub-module 109-3, each candidate audio fingerprint further including a hash code 320-3 and a time-stamp 320-5; and
- a live program information dataset 330 for storing live programs from different program providers, each live program including a program ID 330-1 for uniquely identifying the source of the program (e.g., the TV channel, the radio station and broadcasting frequency, and the website address information), a plurality of candidate audio fingerprints 330-3 corresponding to a particular audio signal segment (e.g., 1-2 minutes) from a live program broadcast service provider, and 330-5 associated with the live program (e.g., a web page or an application).

It should be noted that the modules and datasets in the remote server 107 describe above in connection with FIG. 3 may be implemented on a single computer server or distributed among multiple computer servers that are connected by a computer network. Although a specific hardware configuration may affect the performance of the remote server 107, the implementation of the present application is not dependent on a particular hardware configuration.

In some implementations, the server frontend module 108, which is responsible for receiving a request for interactive content from the mobile device, and transmitting back interactive content or an error message developed by the backend subsystem in response to the request. The server backend module 109, which is responsible for converting live program broadcasts 101 into audio fingerprints, timestamping and segmenting the audio fingerprints of the live program broadcasts, and comparing the numerous segmented audio fingerprints with the fingerprint of the captured audio stream 101a from the mobile device 102. See FIG. 1. But one skilled in the art would understand that this illustrative division of the remote server 107 is not necessary for implementing the present application.

Figure 4A:
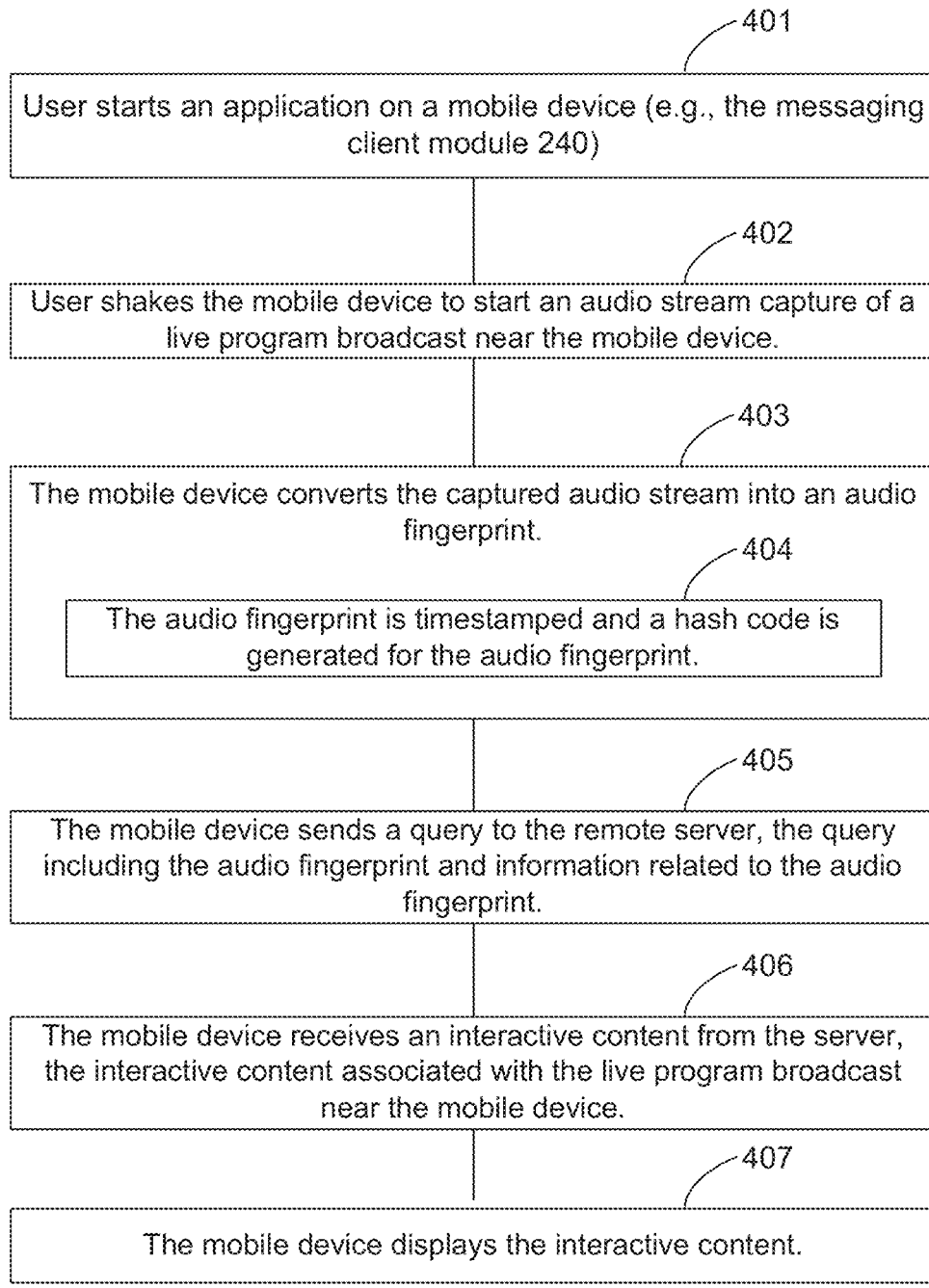
FIGS. 4A and 4B depict a flow chart illustrating a method for providing interactive content from the remote server to the mobile device in response to a query from the mobile device in accordance with some implementations of the present invention.
Figure 4B:
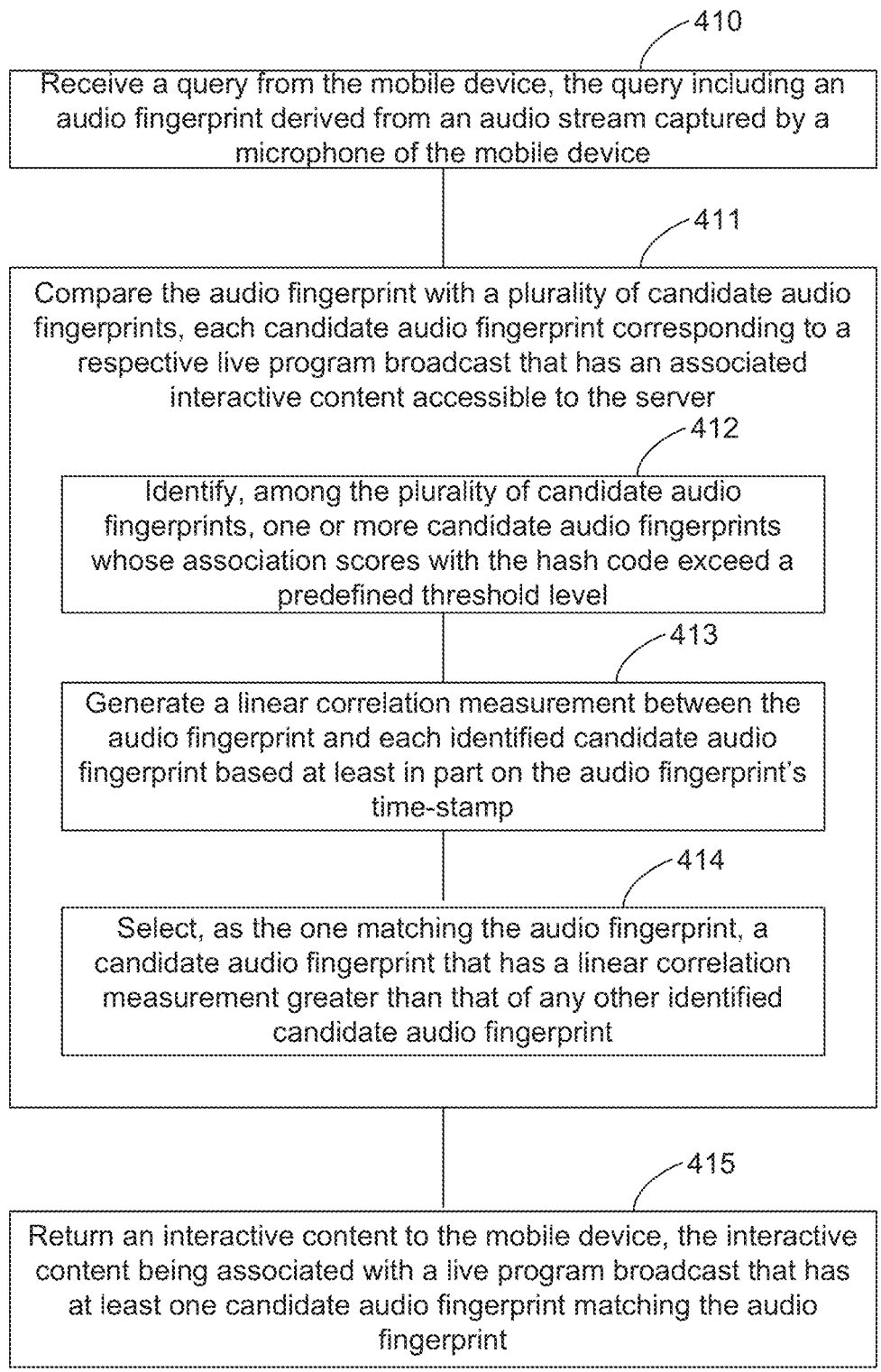

FIGS. 4A and 4B depict a flow chart illustrating a method for providing interactive content from the remote server to the mobile device in response to a query from the mobile device in accordance with some implementations of the present invention.

At step 401, the user starts an application (e.g., the messaging client module 240) on the mobile device. For example, the user may press the application's icon on the smartphone's touch screen to open the application before or after a live program broadcast begins. In some implementations, the application is automatically started by another application running on the mobile device. For example, the messaging client module 240 may provide an application programming interface (API) to another third-party application. While the third-party application runs on the mobile device, it may detect audio signals in the surrounding environment and then activate the messaging client module 240, which then prompts the user to capture the audio signals in order to participate in an interactive program associated with the live program broadcast. In some implementations, the live program broadcast near the mobile device may be one of a radio broadcast, a television broadcast, or a web broadcast, which generates an audio signal that can be captured by the mobile device's microphone.

At step 402, while listening to the live program broadcast, and at some particular point in time the user may decide to check whether the live program broadcast has any interactive content and then interact with the live program broadcast through the interactive content. The interaction may include, for example, an opportunity to receive more information regarding the subject matter of the live program broadcast, a chance to vote for the favorite contestant on the live program broadcast or share the live program broadcast with a friend using, e.g., the messaging service, or even an online shopping opportunity to buy related merchandise. The user may shake his mobile device in order to start an audio stream capture of the live program broadcast. In some implementations, the user is prompted by an audio cue or a visual cue from the mobile device indicating that there might be an interactive section of the live program broadcast currently available. After shaking the mobile device, a ten to fifteen second snippet of the audio stream of the live program broadcast may be captured by the mobile device. Note that there are many other ways of activating the mobile device to capture the audio stream by triggering one of the sensors in a predefined manner, e.g., tapping the mobile device, pressing a predefined button of the mobile device, etc.

At step 403, the mobile device converts the captured audio stream into an audio fingerprint. There are many benefits for converting the audio stream into the audio fingerprint. First, the size of the audio fingerprint is usually smaller than that of the audio stream, which means that less data is required to be transmitted to the remote server. This feature is more important if the mobile device currently has only a cellular wireless connection with the remote server. Second, by converting audio streams into audio fingerprints, there are many known and robust algorithms for determining the similarity between two audio streams by comparing their respective audio fingerprints. For example, the teaching of two well-known approaches for generating the audio fingerprints from audio signals can be found in: (1) J. Haitsma and T. Kalker. *A highly robust audio fingerprinting system*. In Proc. of International Conference on Music Information Retrieval (ISMIR), Paris, France, 2002; and (2) A. Wang. *An industrial-strength audio search algorithm*. In Proc. of International Conference on Music Information Retrieval (ISMIR), Baltimore, Md., USA, October, 2003, both of which are incorporated by reference in their entirety.

In some implementations, at step 404, the mobile device generates a timestamp for the audio fingerprint and a fixed-length hash code for the audio fingerprint. For example, the timestamp may be chosen to be the mid-point of the audio stream. As described below, the timestamp is a parameter used for determining the linear correlation of two audio fingerprints, which then indicates the similarity between the two audio signals behind the audio fingerprints. The hash code is used for reducing the number of candidate audio fingerprints required to be linearly correlated with the audio fingerprint provided by the mobile device so as to make the entire matching process more efficient and reduce the user's waiting time for the matching result.

Figure 5B:
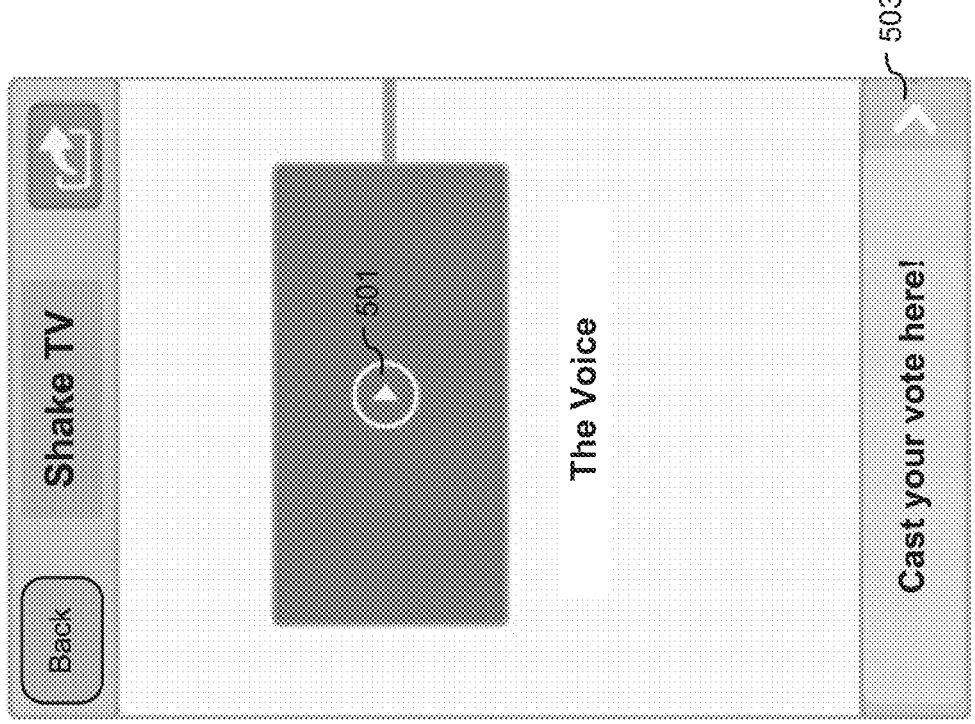
FIGS. 5A and 5B are exemplary screenshots illustrating how the interactive content is rendered at a mobile device.
Figure 5A:
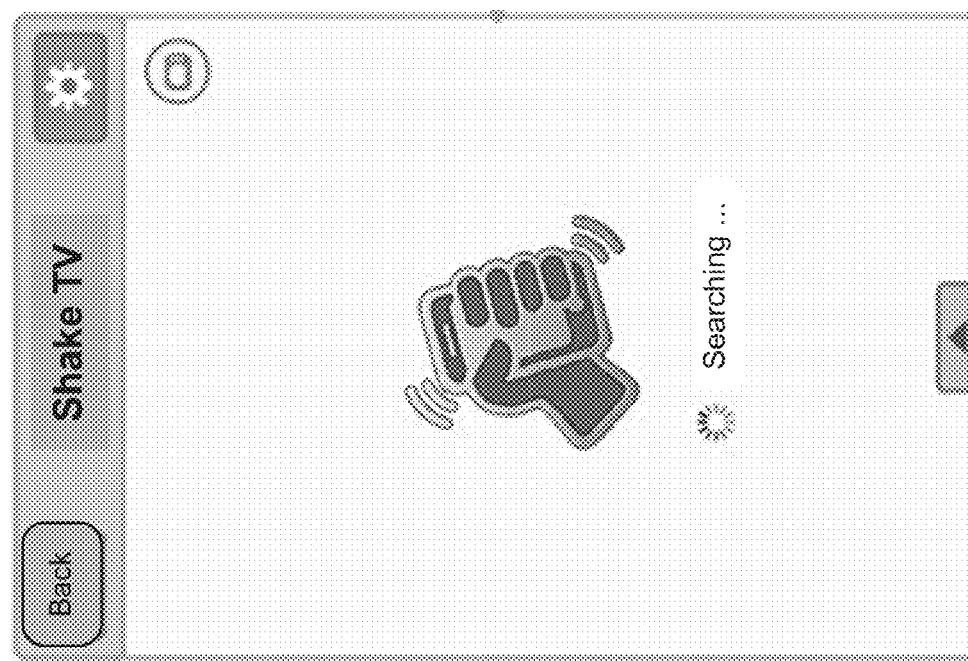

At step 405, the mobile device sends a query to the remote server. The query typically includes the audio fingerprint and information related to the audio fingerprint (e.g., the timestamp and hash code). In some implementations, the audio fingerprint is further compressed before being sent to the remote server to further reduce its size. FIG. 5A is an exemplary screenshot illustrating that the mobile device has submitted a query to the remote server and is waiting for the server to return the interactive content associated with the live program broadcast captured by the mobile device.

Subsequently at step 406, the mobile device receives an interactive content from the remote server. This interactive content is deemed to be associated with the live program broadcast near the mobile device. Note that the interactive content may be pre-stored at the remote server. In some implementations, the remote server may dynamically fetch at least part of the interactive content from other sources, e.g. by submitting a query including search terms related to the live program broadcast to a generic search engine (www.soso.com) or a particular website (e.g., Wikipedia) and supplement the interactive content with additional search results. At step 407, the mobile device displays in the interactive content. In some implementations, the mobile device may display a graphical user interface that includes a plurality of icons associated with the interactive content. Upon detecting a user selection of one of the icons, the mobile device performs a predefined operation associated with the user-selected icon, e.g., voting, downloading data, sharing the live program broadcast with another person, and online shopping. In response to the interactive content, the mobile device may also invoke a social network application to render the interactive content and allow the user to share it with his friends. For example, the user may send a message including a link to the interactive content hosted by the remote server to a predefined account (e.g., a public account shared by many users) at a social networking website so that users who have signed up to follow that public account will receive a message including the link. By clicking on the link, the other users can download the interactive content onto their mobile devices and participate in the same interactive program. In some implementations, another user may be able to configure his registration with the public account so that the interactive content is automatically pushed onto his mobile device without requiring a user click on the link. FIG. 5B is another exemplary screenshot illustrating that the mobile device has rendered the interactive content on its display. The user has two options of interacting with the talent program called "The Voice" by: (i) tapping the play icon 501 to watch the show from the mobile device or (ii) tapping the vote icon 503 to cast his vote for the participants of the talent show.

FIG. 4B illustrates the server-side process in response to a query from the mobile device. At step 410, the server receives a query from the mobile device, the query including an audio fingerprint derived from an audio stream captured by a microphone of the mobile device. If the audio fingerprint has been compressed, the server first decompresses the audio fingerprint. In some implementations, the query further includes a time-stamp indicating when the audio stream was captured at the mobile device and a hash code derived from the audio fingerprint.

At step 411, the server compares the audio fingerprint with a plurality of candidate audio fingerprints, each candidate audio fingerprint corresponding to a respective live program broadcast that has an associated interactive content accessible to the server. As noted above, the remote server independently receives audio streams from numerous live programs from third-party providers. For each live program, the server streams an audio signal segment, which may last between one and two minutes and then generates a set of candidate audio fingerprints for the audio signal segment, each candidate audio fingerprint corresponding to a respective portion of the audio signal segment. Sometimes, there is a partial overlap between two candidate audio fingerprints that correspond to two consecutive portions of the audio signal segment. Because this is a live program, the server abandons a set of candidate audio fingerprints associated with an old audio signal segment if it determines that it is less likely for any user to submit a query including an audio fingerprint corresponding to the audio signal segment. In other words, the server only maintains a set of candidate audio fingerprints corresponding to the current audio signal segment.

In some implementations, the comparison of two audio fingerprints has multiple sub-steps. At step 412, the server first identifies, among the plurality of candidate audio fingerprints, one or more candidate audio fingerprints whose association scores with the hash code exceed a predefined threshold level. By doing so, many audio fingerprints whose hash codes are very different from the one provided by the mobile device will be skipped because they are deemed to be associated with live program broadcasts not captured by the mobile device. At step 413, the server generates a linear correlation measurement between the audio fingerprint and each identified candidate audio fingerprint before. Note that this measurement is based at least in part on the audio fingerprint's timestamp. This linear correlation is similar to a cross-correlation operation of two signals. The more similar the two signals are, the higher the linear correlation measurement. At step 414, the server selects, as the one matching the audio fingerprint, a candidate audio fingerprint that has a linear correlation measurement greater than that of any other identified candidate audio fingerprint.

Finally, at step 415, the server returns an interactive content to the mobile device, the interactive content being associated with a live program broadcast that has at least one candidate audio fingerprint matching the audio fingerprint.

While particular implementations are described above, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof. The term "live program broadcast" as used herein refers to and encompasses live performances, pre-recorded performances, syndicated programs, and any and all types of media that can be broadcast, streamed, or transmitted over a plurality of platforms.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method of providing an interactive content to a prospective user at a mobile device, the mobile device comprising a non-transitory computer readable medium including a computer executable program code and a processor for executing the computer executable program code, the method comprising the steps of:

initiating capture of an audio stream;

capturing the audio stream via a microphone in the mobile device;

converting the captured audio stream into an audio fingerprint;

sending information related to the audio fingerprint to a server, wherein the server is configured to identify a live program broadcast near the mobile device that has at least one candidate audio fingerprint matching the audio fingerprint and its associated interactive content;
receiving the interactive content from the server; and
displaying the interactive content on the mobile device, wherein the interactive content is used by a user of the mobile device to participate in the live program.

2. The method of providing the interactive content to the prospective user at the mobile device according to claim 1, wherein the live program broadcast near the mobile device is at least one of a radio broadcast, a television broadcast, or a web broadcast.

3. The method of providing the interactive content to the prospective user at the mobile device according to claim 1, wherein the mobile device is at least one of a tablet, a smart phone, or a laptop.

4. The method of providing the interactive content to the prospective user at the mobile device according to claim 1, wherein the information related to the audio fingerprint includes a time-stamp indicating when the audio stream was captured and a hash code derived from the audio fingerprint.

5. The method of providing the interactive content to the prospective user at the mobile device according to claim 1, wherein displaying the interactive content on the mobile device further includes:
displaying a graphical user interface that includes a plurality of icons associated with the interactive content;
detecting a user selection of one of the icons; and
performing a predefined operation associated with the user-selected icon, further including submitting data corresponding to the user-selected icon to the server.

6. The method of providing the interactive content to the prospective user at the mobile device according to claim 5, wherein the predefined operation includes at least one of voting, downloading data, sharing the live program broadcast with another person, and online shopping.

7. The method of providing the interactive content to the prospective user at the mobile device according to claim 1, wherein the capture of the audio stream is initiated by at least one of shaking the mobile device, tapping the mobile device in a predefined manner, or pressing a predefined button of the mobile device.

8. The method of providing the interactive content to the prospective user at the mobile device according to claim 1, wherein the interactive content is rendered through a social network application on the mobile device.

9. The method of providing the interactive content to the prospective user at the mobile device according to claim 1, wherein the audio stream has a length of 5-15 seconds.

10. A method for providing an interactive content to a prospective user at a mobile device, the method comprising:
at a server having one or more processors and memory for storing programs to be executed by the processors:
receiving a query from the mobile device, the query including an audio fingerprint derived from an audio stream captured by a microphone of the mobile device;
comparing the audio fingerprint with a plurality of candidate audio fingerprints, each candidate audio fingerprint corresponding to a respective live program that has an associated interactive content accessible to the server; and
returning an interactive content to the mobile device, wherein the interactive content is associated with a live program that has at least one candidate audio fingerprint matching the audio fingerprint wherein the interactive content is to be displayed on the mobile device and used by a user of the mobile device to participate in the live program.

11. The method for providing an interactive content to a prospective user at a mobile device according to claim 10, wherein the query includes a time-stamp indicating when the audio stream was captured at the mobile device and a hash code derived from the audio fingerprint.

12. The method for providing an interactive content to a prospective user at a mobile device according to claim 11, wherein comparing the audio fingerprint with a plurality of candidate audio fingerprints further includes:
identifying, among the plurality of candidate audio fingerprints, one or more candidate audio fingerprints whose association scores with the hash code exceed a predefined threshold level;
generating a linear correlation measurement between the audio fingerprint and each identified candidate audio fingerprint based at least in part on the audio fingerprint's time-stamp; and
selecting, as the one matching the audio fingerprint, a candidate audio fingerprint that has a linear correlation measurement greater than that of any other identified candidate audio fingerprint.

13. The method for providing an interactive content to a prospective user at a mobile device according to claim 10, wherein the plurality of candidate audio fingerprints are generated by:
streaming an audio signal segment from a live program broadcast service provider;
generating a set of candidate audio fingerprints for the audio signal segment, each candidate audio fingerprint corresponding to a respective portion of the audio signal segment; and
replacing a set of candidate audio fingerprints associated with a previous audio signal segment from the live program broadcast service provider with the newly-generated set of candidate audio fingerprints.

14. The method for providing an interactive content to a prospective user at a mobile device according to claim 13, wherein there is a partial overlap between two candidate audio fingerprints that correspond to two consecutive portions of the audio signal segment.

15. A mobile device, comprising:
a processor;
audio circuitry for detecting audio signals and converting the audio signals into audio streams;
a sensor for detecting movements of the mobile device; and
memory for storing programs, wherein the programs, when executed by the processor, causes the process to perform the following instructions:
initiating capture of an audio stream;
capturing the audio stream via a microphone in the mobile device;
converting the captured audio stream into an audio fingerprint;
sending information related to the audio fingerprint to a server, wherein the server is configured to identify a live program broadcast near the mobile device that has at least one candidate audio fingerprint matching the audio fingerprint and its associated interactive content;
receiving the interactive content from the server; and
displaying the interactive content on the mobile device, wherein the interactive content is used by a user of the mobile device to participate in the live program.

16. The mobile device according to claim 15, wherein the information related to the audio fingerprint includes a timestamp indicating when the audio stream was captured and a hash code derived from the audio fingerprint.

17. The mobile device according to claim 15, wherein the instruction for displaying the interactive content on the mobile device further includes instructions for:
displaying a graphical user interface that includes a plurality of icons associated with the interactive content;
detecting a user selection of one of the icons; and
performing a predefined operation associated with the user-selected icon, further including submitting data corresponding to the user-selected icon to the server.

18. A server, comprising:
one or more processors; and
memory for storing programs to be executed by the processors, the programs further including instructions for:
receiving a query from a mobile device, the query including an audio fingerprint derived from an audio stream captured by a microphone of the mobile device;
comparing the audio fingerprint with a plurality of candidate audio fingerprints, each candidate audio fingerprint corresponding to a respective live program that has an associated interactive content accessible to the server; and
returning an interactive content to the mobile device, wherein the interactive content is associated with a live program that has at least one candidate audio fingerprint matching the audio fingerprint, wherein the interactive content is to be displayed on the mobile device and used by a user of the mobile device to participate in the live program.

19. The server according to claim 18, wherein the query includes a time-stamp indicating when the audio stream was captured at the mobile device and a hash code derived from the audio fingerprint.

20. The server according to claim 19, wherein the instruction for comparing the audio fingerprint with a plurality of candidate audio fingerprints further includes instructions for:
identifying, among the plurality of candidate audio fingerprints, one or more candidate audio fingerprints whose association scores with the hash code exceed a predefined threshold level;
generating a linear correlation measurement between the audio fingerprint and each identified candidate audio fingerprint based at least in part on the audio fingerprint's time-stamp; and
selecting, as the one matching the audio fingerprint, a candidate audio fingerprint that has a linear correlation measurement greater than that of any other identified candidate audio fingerprint.

* * * * *